July 22, 1969  A. R. RODRIGUEZ ET AL  3,456,313
PROCESS FOR MANUFACTURING A MULTILAYER CERAMIC CAPACITOR
Filed Jan. 6, 1966                                           3 Sheets-Sheet 1

INVENTORS
ANTONIO R. RODRIGUEZ
JOHN CRONIN
BY
ATTORNEY

INVENTORS
ANTONIO R. RODRIGUEZ
JOHN CRONIN
BY
ATTORNEY

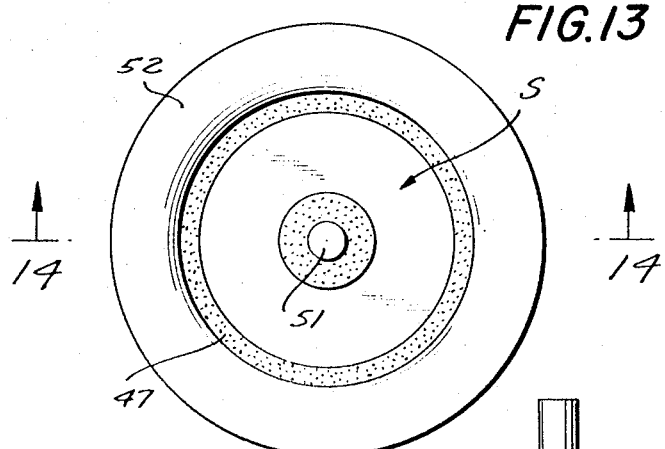
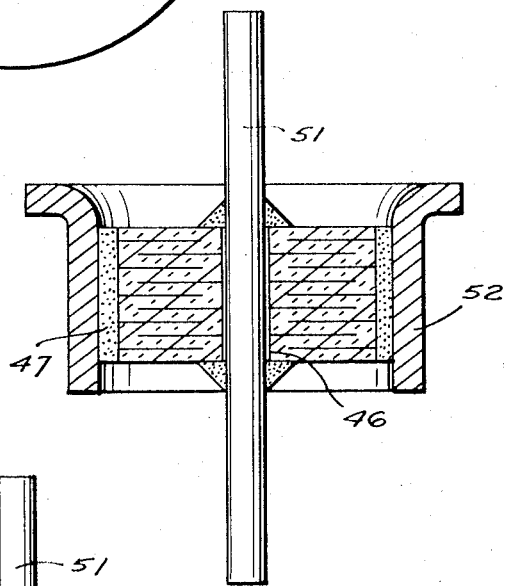
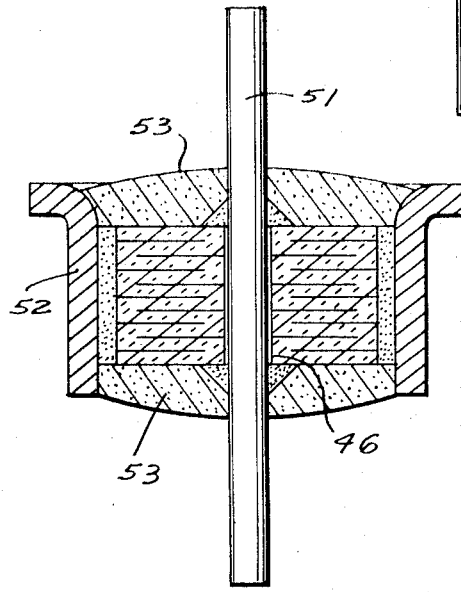

United States Patent Office 3,456,313
Patented July 22, 1969

3,456,313
PROCESS FOR MANUFACTURING A MULTILAYER CERAMIC CAPACITOR
Antonio R. Rodriguez, Franklinville, and John Cronin, Bolivar, N.Y., assignors to Aerovox Corporation, New Bedford, Mass., a corporation of Massachusetts
Continuation-in-part of application Ser. No. 221,855, Sept. 6, 1962. This application Jan. 6, 1966, Ser. No. 519,043
Int. Cl. H01g 13/00
U.S. Cl. 29—25.42                              7 Claims

ABSTRACT OF THE DISCLOSURE

The present invention relates to a multilayer capacitor and more particularly to a capacitor having alternate layers of ceramic dielectric and metal. More particularly, the capacitor comprises a plurality of superimposed ceramic plates each having one surface thereof coated with a metal electrode which is in intimate contact with the uncoated ceramic surface of the next adjacent plate.

---

Figure 1:
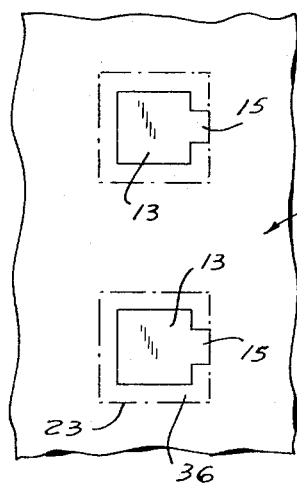

The application is a continuation-in-part of copending application Serial No. 221,855, filed September 6, 1962.

As conducive to an understanding of the invention, it is noted that where capacitors of the above type are formed by superimposing plates of ceramic material in the green state, which have been previously coated on one face with a metallic electrode material and then applying pressure to the stack thus formed in a confined region such as a cavity, due to the presence of air entrapped in the cavity and between the plurality of layers of plates, intimate contact between the adjacent surfaces of the plates could not be achieved even when extremely high pressures were used. As a result, the capacity of the resultant capacitor was less than would be achieved if such intimate contact could be obtained. Furthermore, where the green ceramic had a high water content, it was relatively impervious, with the result that the air entrapped between successive plates could not pass through the ceramic material itself, with the resultant difficulties above noted.

Inasmuch as the critical regions required to be in intimate contact are the metal electrode and the ceramic, in view of the difficulties above noted in forming the capacitor, it has been the practice to coat both surfaces of each plate with the metal electrode. Thus, even if there should be an air layer between adjacent metallic surfaces of adjacent plates, since each metallic surface was in intimate contact with its associated ceramic surface by reason of the prior coating step, even if the metal surfaces were not in intimate contact, there would be no affect on the capacity of the unit formed.

However, since such process requires that both surfaces of each green ceramic plate be metallized, the cost of manufacture is increased.

The object of the present invention is to provide a novel process for making a multilayer capacitor from a stack of superimposed ceramic plates, each having a single metal coated surface which will form a rugged integral structure and will aid in obtaining extreme miniaturization with high capacity and high reliability.

Another object is to provide a novel method of making capacitors, particularly designed for airborne and spaceborne equipment, in which space, economy, reliability and ruggedness are most desirable, and in which very thin sections may be employed without difficulty because of brittleness.

Still another object of the present invention is to provide a method of manufacturing a ceramic capacitor of extremely small size as compared to the capacity rating.

In accomplishing the above objects, it has been found most desirable to utilize ceramic materials having high dielectric constants, particularly mixtures of titanates, zirconates, stannates of the alkali earth metals, such as calcium, barium and strontium as well as titanium dioxide. It is also possible to use ceramic materials of low dielectric constant as alumina, steatite and other silicates for lower dielectric constants. In the manufacture of these extremely compact capacitors the following steps are taken.

Firstly, thin flexible sheets of ceramic composition containing a plastic binder are formed by casting from a slip devoid of bubble. All such bubbles caused by air or other gases must be removed from the slip prior to the casting operation.

Secondly, the thin flexible ceramic sheets after being dried so that the water content is from 6 to 8% by weight, but with the sheet still in green form, have applied to one side thereof an electrode of a refractory metal which does not melt or oxidize at the firing temperature of the ceramic composition. The refractory metal is preferably applied at spaced intervals on the sheet and the capacitor plates are subsequently punched out of the sheet.

The metallic refractory material is desirably formed of finely divided particles of palladium, platinum or other non-oxidizable metals.

These finely divided metallic materials are suspended in a vehicle with a binder and the suspension is applied to the surface of the thin flexible ceramic sheet by offset printing, spraying, painting with a brush or by a squeegee-screen method.

As the next step the electroded sheets, after being dried, further to reduce the water content to say 4 to 5% by weight, are punched in a die to form plates of the desired size and shape. If desired, the plates may be punched individually by a single die or a plurality of plates may be punched from the sheet by a multiple die. Furthermore, a plurality of sheets may be superimposed to form a stack and such stack may be punched by a single or multiple die.

According to one embodiment of the invention, individual, punched capacitor plates may be stacked in the cavity of a press.

According to another embodiment of the invention, the die whereby the plates are punched, may have a cavity of sufficient size to accommodate the individual plates as they are punched or to accommodate a stack of plates which are punched from a plurality of superimposed sheets.

In any event, the cavity will contain a plurality of superimposed plates each having, for example, its top surface only with a metal electrode and with the topmost plate, preferably not being electroded. Thereupon, when a sufficient number of plates is positioned in the cavity, depending upon the capacitance of the capacitor to be formed, pressure in the order of from 10 to 30 tons per square inch is applied against the stack in the cavity and the entrapped air in the cavity is permitted to escape while at the same time lateral displacement of the stack in the cavity is restrained.

As a result, the plates with their electrodes will be compressed into an integral solid structure.

After compression of the stack, as above described, it is removed from the die and then is metallized by painting or otherwise covering with metal particles, the exposed edges of the electrodes to complete parallel connections thereto.

The same metal may be utilized as has been utilized for application to the surface of the sheets for electroding.

Thereupon, the stack is fired at the maturing temperature of the ceramic, which vary with the exact composition and illustratively ranges between 2,100 and 2,600° F.

It is to be understood that if desired, the last mentioned metallizing step may be made after firing.

Terminal leads are then soldered on as usual and finally the unit may be given a protective insulating coating.

The desired form of the capacitor may be square, rectangular or circular and the plates may be formed with or without margins as desired.

Figure 2:
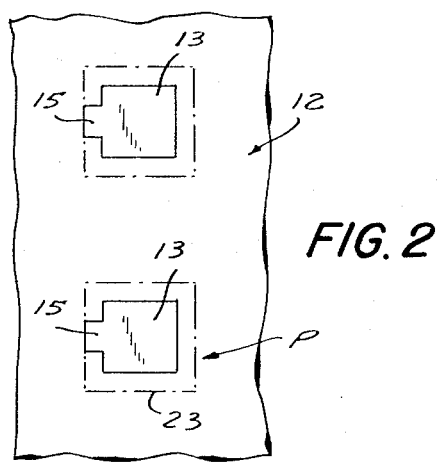
Figure 3:
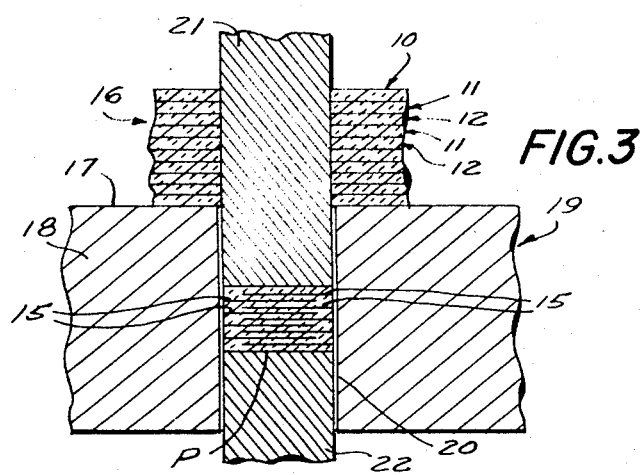
Figure 4:
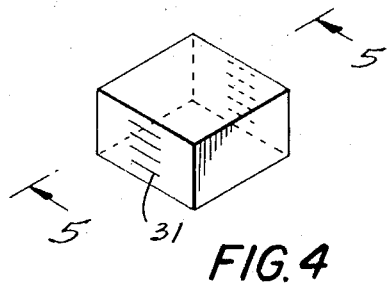
Figure 5:
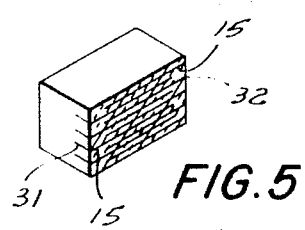
Figure 6:
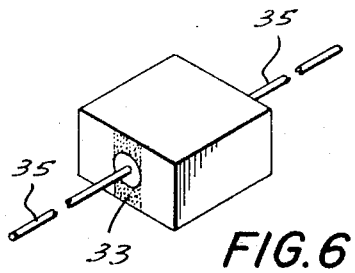
Figure 7:
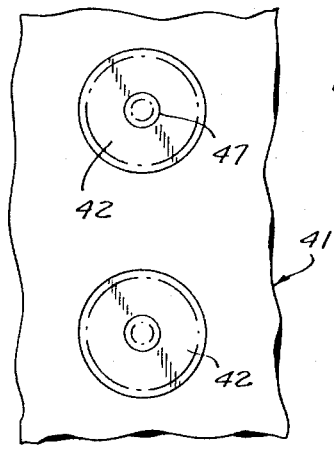
Figure 10:
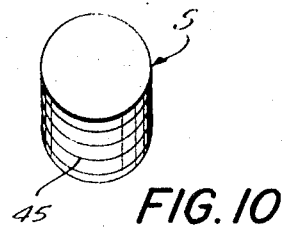
Figure 8:
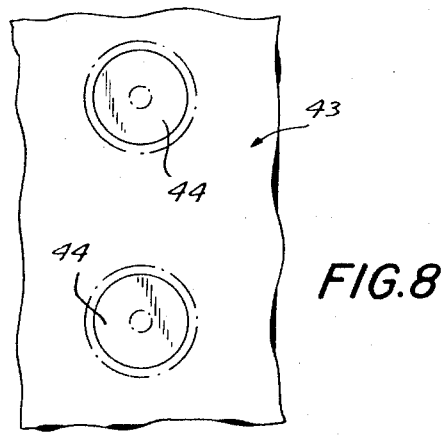
Figure 11:
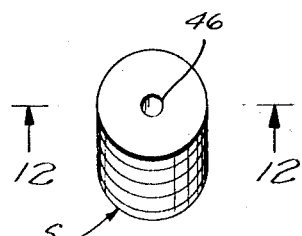
Figure 12:
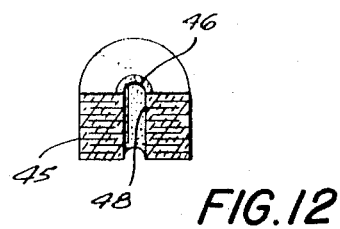
Figure 9:
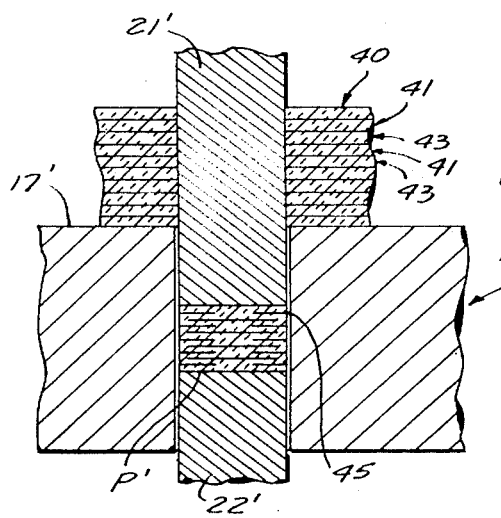

In the accompanying drawings in which are shown one or more of various possible embodiments of capacitors formed by the process hereof, FIG. 1 is a fragmentary diagrammatic plan view of a ceramic sheet showing one of the metal electrodes thereon, FIG. 2 is a view similar to FIG. 1, but showing a sheet having the connector tab of the electrode extending in the opposite direction to the connector tab of FIG. 1, FIG. 3 is a transverse sectional view illustrating the die for punching the plates from a stack of superimposed sheets, FIG. 4 is a diagrammatic perspective view showing the stack after compression and removal from the die, FIG. 5 is a transverse sectional view taken along line 5—5 of FIG. 4, FIG. 6 is a perspective view showing the capacitor with leads attached thereto, FIG. 7 is a view similar to FIG. 1, showing a circular electrode, FIG. 8 is a view similar to FIG. 7 but showing a sheet having a circular electrode complementary to that of FIG. 7, FIG. 9 is a transverse sectional view illustrating the die for punching the plates from a stack of superimposed sheets of the type shown in FIG. 7 and FIG. 8, FIG. 10 is a diagrammatic perspective view showing the stack of compressed punched-out sheet elements formed by the punching operation of FIG. 9, FIG. 11 is a diagrammatic perspective view similar to FIG. 10 of the stack with a central hole or opening punched therethrough, FIG. 12 is a sectional view taken along line 12—12 of FIG. 11, showing the application of a metallized coating upon the wall of the central opening, FIG. 13 is a diagrammatic top plan view on a larger scale, of the stack of FIG. 11 with a central lead applied to the central hole in the stack and with a casing in position around the stack, FIG. 14 is a transverse vertical sectional view taken upon line 14—14 of FIG. 13 showing the interior structure of the unit of FIG. 13 upon an enlarged scale, and FIG. 15 is a transverse sectional view similar to FIG. 14 with the potting compound in position.

The process of forming the sheets from a ceramic mix is described in Patent No. 3,004,197 of Antonio R. Rodriguez and Arthur B. Wallace.

The process may be summarized as follows:

The ceramic mix from which the sheets are made contains the ceramic powder, for example, calcium and barium titanate and zirconate slurried in an aqueous liquid in which composition it is mixed with binders such as polyvinyl alcohol and deflocculants, such as lignates or alginates.

The slip is freed of bubbles by deairing as by subjecting it to a vacuum before casting and formation into a sheet.

The deairing may be accomplished in a dispersion machine under a vacuum of 28" while the material is a slurry before casting into layers, while at the same time breaking up all agglomerates.

The slurry is then cast on a smooth impervious surface and is left to dehydrate or is dried in an oven to form a coherent flexible sheet which may be handled and punched, with the binder holding the particles together.

The sheets when formed will carry about 8 to 15% of polymer binder which is usually polyvinyl alcohol.

Sheets may be 5 mils or less in thickness after firing. The sheet desirably is in continuous form and may be rolled up and then unrolled for metallizing and punching.

The metallizing is desirably accomplished, as for example, by screening or spraying from a suspension of platinum or palladium or other metal, which can withstand the firing temperature without melting or oxidizing.

The platinum or palladium is finely disposed in a fineness of 1 to 10 microns in an organic solvent having a high boiling point such as butyl cellosolve or carbitol acetate in the presence of an organic binder, and after being applied to the sheet, the coating is dried in an oven at a temperature of about 60 to 100° C. and the water content of the green ceramic is reduced to between 4 to 6% by weight.

Referring now to the drawing, in the embodiment illustratively shown in FIGS. 1 to 6 inclusive, green ceramic sheets 11, 12 have been prepared as above described and each sheet is metallized only on its top surface to form a substantially rectangular electrode portion 13, such electrode having a connector tab portion 15.

The metallized pattern defined by the electrode 13 and tab 15 is preferably repeated at equally spaced intervals on each sheet so that when the sheets are to be superimposed for subsequent punching in the manner hereafter described and the sheet 12, for example, is reversed so that it is in the position shown in FIG. 2, when the sheet 12 is superimposed on the sheet 11, the electrodes 13 of each sheet will be in alignment and the tabs 15 will extend in opposite directions.

In one illustrative embodiment of the invention, a plurality of pairs of superimposed sheets 11, 12 are arranged on top of each other to form a stack, the electrodes 13 being in alignment and the tabs 15 alternately extending on opposite sides of such aligned stack of electrodes. Thereupon, the stack of sheets, designated by the reference numeral 16, is placed on the top surface 17 of the body portion 18 of a die 19, the latter having a bore 20 therethrough. Associated with the bore is an upper punch 21 and a lower punch 22. The bore is illustratively rectangular in cross section, as are the punches 21, 22 and the dimension of the uppermost punch 21, for example, is equal to the desired size of the plate P to be punched from each of the ceramic sheets and more particularly is of dimension corresponding to the broken lines shown at 23 in FIGS. 1 and 2.

Thereupon, the upper punch is forced downwardly in conventional manner to cut a plurality of capacitor plates from the stack of sheets 16.

The punch is moved relatively slowly into the bore 20 and pressure is exerted in the order of from 10 to 30 tons per square inch upon the stack of plates P now positioned in the bore 20.

Although minimum spacing between the wall of bore 20 and the periphery of the upper punch 21 is desired to make a clean cut and such spacing is generally in the order of .1 to .15 mils, it has been found that such spacing can be increased to say .25 to .3 mils without materially affecting the cut. However, certain important advantages have been found to occur with such increased spacing. With the spacing of .1 to .15 mils, previously employed, when pressure was exerted by the upper punch 21 against the stack of plates, they susbtantially immediately expanded the slight amount afforded by reason of such small spacing, with the result that the air entrapped between the adjacent plates could not readily escape. As a result, when the upper punch was removed, such air which had been greatly compressed, would expand causing some separation between the ceramic and the electrode surface adjacent thereto, with resultant decrease of the capacity of the unit.

By reason of the increased spacing between the punch and the wall of the bore according to the invention hereof, before the plates could expand to the wall of the bore by reason of the pressure applied thereto, substantially all of the air entrapped between the plates would be expelled.

Consequently, when the pressure was released, the amount of entrapped air would be so minimal, that if any separation occurred between the electrode surface and the ceramic surface, it had no appreciable effect on the capacity of the unit.

Furthermore, it has been found that by subjecting the electroded sheet to the drying step to reduce its water content to say 4 to 6% by weight, although the sheet was retained in its green state, its porosity was greatly increased.

Consequently, when pressure was thereafter applied to the stack of plates, any entrapped air would also diffuse through the pores in the plates so that the juxtaposed surfaces thereof would come into intimate engagement with such application of pressure.

Although, as above described, a plurality of sheets are punched simultaneously to form the plates of the stack, it is understood that the plates may be formed separately and positioned in a die cavity to form a stack; plates may be punched directly into the die cavity from individual sheets to form the stack or if necessary to provide the necessary capacitance, a plurality of stacks of plates in the green state may be positioned in the die and then be subjected to the application of pressure.

In any event, the final stack is pressed together, as above described, so that the plates are substantially integrated and the resultant block is then removed from the cavity 20.

Referring to FIGS. 4 and 5, for example, the edges 31, 32 of the connector tabs 15 will be available at opposed ends of the stack. Thereupon, according to one illustrative embodiment of the invention, the edges 31, 32 at each end of the stack may be covered by metal particles as at 33 to complete the parallel connections to the electrodes 15 and the stack is then fired at a temperature of say 2100 to 2600° F. depending upon the exact composition of the ceramic, to mature the latter and hence to form a hard rigid block of dielectric with intervening alternating electrodes.

If desired, the stack may be fired prior to the application of the metal particles 33 to complete the parallel connections to the electrodes.

Although the metal particles 33 are preferably of the same material as that of which the electrodes are formed, they may also be of silver, for example.

Terminal leads 35 are then soldered in position against the metal particles 33 which connect the exposed edges 31, 32, the solder completely covering said edges 31, 32. If desired, an insulating covering may then be formed around the unit thus described.

The process above described will thus give a multilayer capacitor with dielectric margins 36 inside the cutting lines 23, thereby forming a protective margin envelope and hermetically sealing the unit, except for the exposed edges 31, 32, which edges are themselves sealed by the application of the solder over the metallized particles 33 connecting the edges 31, 32.

Desirably, the top sheet 10 from which the uppermost plate is formed is not metallized so that all of the electrodes will be embedded in the block formed.

The embodiment of the capacitor formed by the process herein described, shown in FIGS. 7 to 15 inclusive, is of the type known as a "feed through" capacitor.

In this embodiment the sheet 41 shown in FIG. 7 is metallized with an annular pattern 42 on its top surface and the sheet 43 shown in FIG. 8 is metallized with a circular disc pattern 44 on its top surface, the diameter of the disc 44 shown in FIG. 8 being smaller than that of the diameter of the annulus 42 shown in FIG. 7. The metallized coating is then dried and the water content of the green ceramic is reduced to 4 to 6% by weight.

A stack of alternating sheets 41 and 43 is positioned on the top surface 17' of die 19' shown in FIG. 9 so that the annular pattern 42 and disc pattern 44 are axially aligned. The die 19' is identical to that shown in FIG. 3 except that its bore and punches are circular in cross section. The diameter of the punch 21' is slightly less than the diameter of the annulus 42 of FIG. 7 and slightly greater than the diameter of the disc 44 of FIG. 8 to insure that when the sheets are punched, the metallized edge 45 of the annulus 42 will be exposed on the outer periphery of the stack formed.

Desirably, the top sheet 40 of the stack is not metallized so that all of the electrodes will be embedded in the block to be formed.

After the plates P' are formed by punching, the stacked sheets are subjected to a pressure of say between 10 to 30 tons per square inch which provides the intimate contact between the metallized or electrode area of one plate with the ceramic surface of the plate superimposed thereon. The stack is removed from the die and the unit suitably supported in a jig to permit the drilling of a hole 46 axially through the plates. The diameter of the hole 46 punched through the stack is less than the diameter of the opening 47 in the annular pattern 42 of FIG. 7 so that there will be exposed on the bore surface of the hole 46 thus formed, as shown in FIG. 12, the inner edges 48 of the holes formed in the discs 44 of FIG. 8.

Thereupon, the drilled stack is fired to a maturing temperature in the range of 2,100 to 2,600° F. to form a hard, rugged block of dielectric with intervening alternating electrodes as shown in FIG. 12.

The bore surface of hole 46 is preferably coated with a suitable metal to connect the exposed edges 48 of the electrodes 44 formed on the plates P' punched from sheets 43, and the exposed outer edges 45 of the electrodes 42 formed on the plate P' punched from sheets 41 are also connected by a suitable metal layer 47 (FIG. 14).

Preferably, the outer periphery of the cylindrical stack S thus formed and the inner surface of the bore 46 are metallized with the same material as used to make the electrode patterns and preferably prior to firing of the stack. As indicated in FIGS. 13 to 15, a central lead 51 may be positioned in the metallized bore 46 to form a connection to the electrodes 44. The outside metallizing 47 provides an exterior connection between the electrodes 42.

If desired, a metal casing 52 is placed around the entire unit and is electrically connected as by soldering to the metallized coating 47.

Furthermore, as shown in FIG. 15, a potting compound 53 may be poured into the opposed ends of the unit to seal the latter.

With the process above described, only a single surface of each of the plates need be coated with the electrode material, yet the desired intimate engagement of the electrode material on one plate with the ceramic material on the adjacent plate is afforded to insure that the highest capacitance possible can be obtained in a unit of given dimensions.

The resultant capacitor will be extremely compact and will be of great physical strength and ruggedness and furthermore, by reason of the high density obtained by the applied pressure and the subsequent firing of the ceramic, it will have substantially no porosity and hence will be substantially unaffected by humidity thereby assuring high reliability.

As many changes could be made in the above process and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A process for forming a ceramic capacitor unit of extremely small size as compared to capacity from ceramic materials which comprises first forming by casting and then drying thin coherent flexible green ceramic sheets containing a plastic binder from a slip devoid of air bubbles so that the water content is from 6 to 8% by weight, metallizing a region on one surface of each sheet with a refractory metal which does not melt or oxidize at the firing temperature of the ceramic composition and then drying the metallized sheets so that the water content thereof is 4 to 6% by weight, punching the sheets so as to form capacitor plates of desired shape and dimension and stacking the punched plates so that the metallized region of one plate is in juxtaposition to the non-metallized surface of the adjacent plate, providing intimate contact between the sheets by subjecting the stack of pressure while permitting escape of substantially all of the air entrapped between adjacent plates and while confining any substantial lateral displacement of the plates forming the stack to compress the plates into an integral solid structure and thereupon firing the stack at a maturing temperature to burn off the binder and mature the ceramic from which the stack is formed.

2. The process set forth in claim 1 in which the pressure is gradually applied to the stack to insure escape of the air entrapped between the plates.

3. The process set forth in claim 1 in which the metallized region forms an electrode portion and a terminal connecting portion and the stacked plates are arranged so that the terminal connecting portions of one group of alternate electrodes are aligned and displaced from the terminal connecting portion of the other group of alternate electrodes.

4. The process set forth in claim 3 in which a stack of metallized sheets is punched simultaneously.

5. The process set forth in claim 3 in which the sheets are punched to form a non-metallized margin around the electrode portion.

6. The process set forth in claim 1 in which the punching operation forms a circular plate.

7. The process set forth in claim 1 in which a metallized annular region is formed on one group of sheets and a metallized circular disc-shaped region is formed on another group of sheets, the diameter of the disc-shaped region being less than that of the annular region, the sheets are punched to form circular plates of identical diameter, the diameter of the plates having the annular region being less than the initial diameter of such region and the diameter of the disc-shaped region being less than the diameter of the plates having the annular region, the plates are stacked with said annular region and disc-shaped region alternating and a bore of diameter less than that of the central opening in said annular region is drilled axially through the stack, whereby edges of the metallized regions will be exposed alternately on the interior of the bore and the exterior of the stack.

References Cited

UNITED STATES PATENTS

| | | | |
|---|---|---|---|
| 1,766,370 | 6/1930 | Beyland | 29—25.42 |
| 2,186,381 | 1/1940 | Howe | 29—432 |
| 2,531,389 | 11/1950 | Brandt | 29—25.42 |
| 3,266,121 | 8/1966 | Rayburn | 29—25.42 |
| 3,264,709 | 8/1966 | Lupfer | 29—25.42 |
| 3,319,312 | 5/1967 | Brajer | 29—25.42 |

JOHN F. CAMPBELL, Primary Examiner

RICHARD BERNARD LAZARUS, Assistant Examiner

U.S. Cl. X.R.

29—25.41